Feb. 10, 1942.  E. J. VON PEIN  2,272,448
CARD PUNCHING MACHINE
Filed Sept. 26, 1939   6 Sheets-Sheet 1

FIG. 1.

INVENTOR
Edward J. Von Pein
BY
ATTORNEY

Feb. 10, 1942.　　　E. J. VON PEIN　　　2,272,448
CARD PUNCHING MACHINE
Filed Sept. 26, 1939　　　6 Sheets-Sheet 2

FIG. 2.

INVENTOR
Edward J. Von Pein
BY
ATTORNEY

Feb. 10, 1942.     E. J. VON PEIN     2,272,448
CARD PUNCHING MACHINE
Filed Sept. 26, 1939     6 Sheets-Sheet 3

FIG. 3.

Feb. 10, 1942.  E. J. VON PEIN  2,272,448
CARD PUNCHING MACHINE
Filed Sept. 26, 1939    6 Sheets-Sheet 5

INVENTOR
Edward J. Von Pein
BY
ATTORNEY

Feb. 10, 1942.  E. J. VON PEIN  2,272,448
CARD PUNCHING MACHINE
Filed Sept. 26, 1939  6 Sheets-Sheet 6

FIG. 8.

INVENTOR
Edward J. Von Pein
BY
ATTORNEY

Patented Feb. 10, 1942

2,272,448

UNITED STATES PATENT OFFICE 2,272,448

CARD PUNCHING MACHINE

Edward J. Von Pein, Dayton, Ohio, assignor to International Business Machines Corporation, New York, N. Y., a corporation of New York Application September 26, 1939, Serial No. 296,548

11 Claims. (Cl. 164—113)

This invention relates to cash registers and more particularly to the type which has a coordinated card punching device for punching a tabulating card representing the amount of the sale entered in the cash register. The tabulating cards are punched to represent not only the amount of the sale but additional classification data which is utilized for separating or sorting the cards according to the classifications designated. The sorted cards are then utilized to control a card controlled tabulating machine which provides the desired statistical data, and therefore, complete information pertaining to the business in which the card punching machines are utilized.

Machines having this combination of structures have been previously designed but their design has been confined largely to cash registers having a high registering capacity, whereas the present invention is directed to the incorporation combination of a punching mechanism with a cash register having a low capacity of registration.

The main object of the present invention is the provision of a punching mechanism combined with a cash register which is capable of punching a tabulating card to represent sales which are small in denomination and value. This object is attained by providing a cash register of the key operated type, and which is usually utilized for entry of small amounts, with a punching mechanism which will punch on a card designations representing the amount of the sale as well as the desired classification data.

Another object of the invention is to provide an improved form of construction of a punch selecting mechanism whereby the punch selectors are set during the ordinary reciprocation of the operating keys, this construction permitting the conventional operation of a key operated cash register.

A still further object of the invention is to provide means to initiate an operation of the punching machine by the arrival of a drawer to an extended position, and which may comprise the cash drawer of a registering machine which is usually released during the downward stroke of the keys. A locking mechanism is preferably provided to lock the cash drawer in its outward released position to prevent its return until the punching operation is completely effected.

The cash register is also equipped with a control which upon completion of the operation of the punching machine automatically unlocks the drawer, which permits its return to normal position within the cash register cabinet.

Other and incidental, but relatively important objects of the present invention are directed to; an electrical means for resetting to normal the previously set punch selector elements; an improved form of escapement mechanism for the punch selector carriage and which includes a control in the punching machine which causes, after each punching operation, the escapement mechanism to permit the carriage to move another step; and a control whereby a special key usually the "no sale" key of the machine prevents the operation of the punching machine so as to prevent the punching of a tabulating card during no sale operations of the cash register, since such operations are merely for the purpose of releasing the cash drawer.

Other objects of the invention will be pointed out in the following description and claims and illustrated in the accompanying drawings, which disclose, by way of example, the principle of the invention and the best mode, which has been contemplated, of applying that principle.

Figure 2:
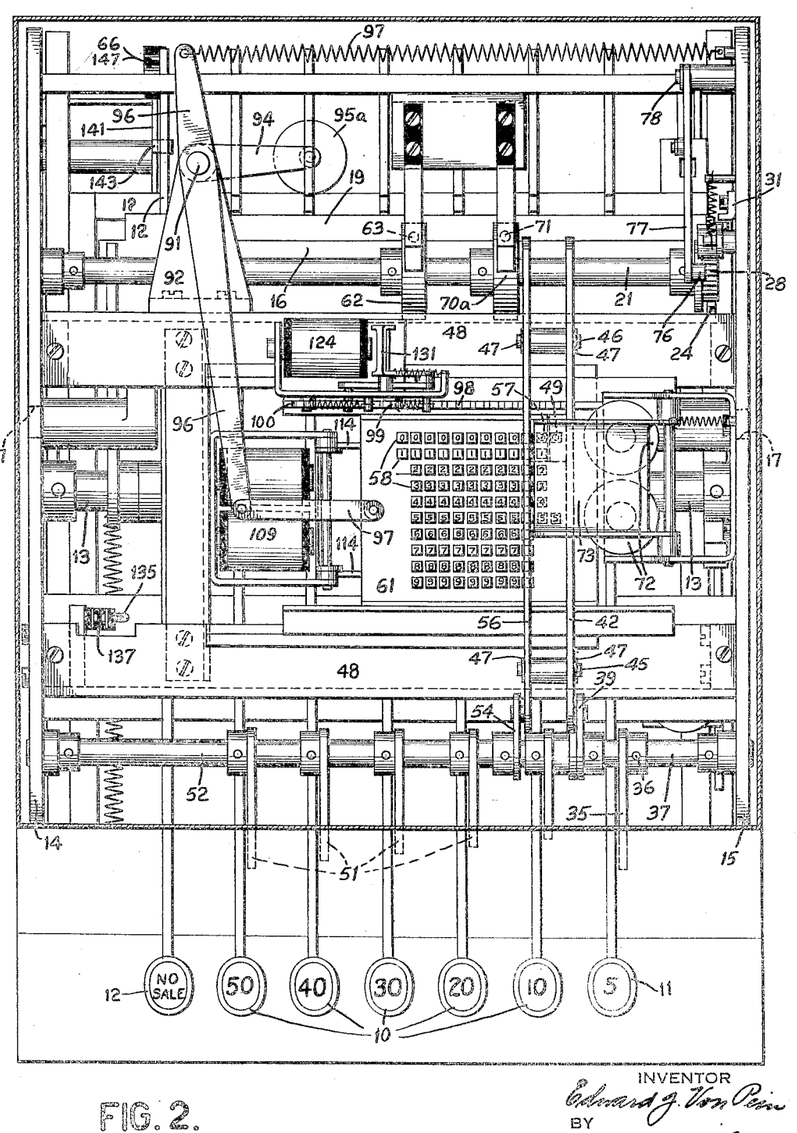
Fig. 2 is a plan view taken on the line 2—2 of Fig. 1 and shown on an enlarged scale.

Described in detail the cash register comprises a series of dimes keys 10, capable, in the present machine, of registering amounts from ten to fifty cents, and also a five cent key, designated 11 in Fig. 2, which is capable of registering a five cent amount and which may be operated alone or together with one of the selected dimes keys for registering the selected tens and the five cent amount. It is preferable to include in the cash register a special key, designed 12 in Fig. 2, which is the "no sale" key, and the latter is operated when the machine is to be operated solely for release of the cash drawer.

The present cash register is adapted to be used in a store in which the articles purchased do not exceed fifty-five cents. Such machines are well adapted for use in certain types of stores where the articles sold are low in cost. It is obvious, that, if so desired, the capacity for registration of the amounts may be increased or altered in accordance with the requirements.

All of the keys 10, 11 and 12 are pivotally mounted upon a transverse shaft 13 supported in side frames 14 and 15 (Fig. 2). Common to all of the keys 10, 11 and 12 is a key coupler 16 (Fig. 1) of a form well known in the art and fully described in the patent to Thomas Carney, No. 497,860, dated May 23, 1893. The key coupler 16 is journaled by trunnions 17 (Fig. 2) in the side frames 14 and 15 and normally rests on the rear ends of the keys 10, 11 and 12. Each of the aforementioned keys is provided with a notch 18 which is adapted to cooperate with a lip 19 formed on the rear edge of the key coupler 16 when any of the keys are depressed.

The function of the key coupler 16, as well known in the art, is to permit the starting of the operation of two keys, for example, the twenty cent key and the five cent key and then complete the operation by pressing either one of the two keys. By reason of the engagement of the lip 19 of the key coupler with the notches 18 in the keys, both keys will be fully operated by the complete depression of either one of the two.

The machine may be provided with any suitable form of interlocking device between the keys of the same bank wherein only one of such keys may be operated. This function is preferably performed by means of pivoted hangers or key stops, designated by reference numeral 20 in Fig. 1. The construction of such key stops or hangers is fully shown in the patent to Von Pein No. 1,824,247, dated September 22, 1931, referring particularly to Fig. 2 of the drawings of this patent.

Figure 1:
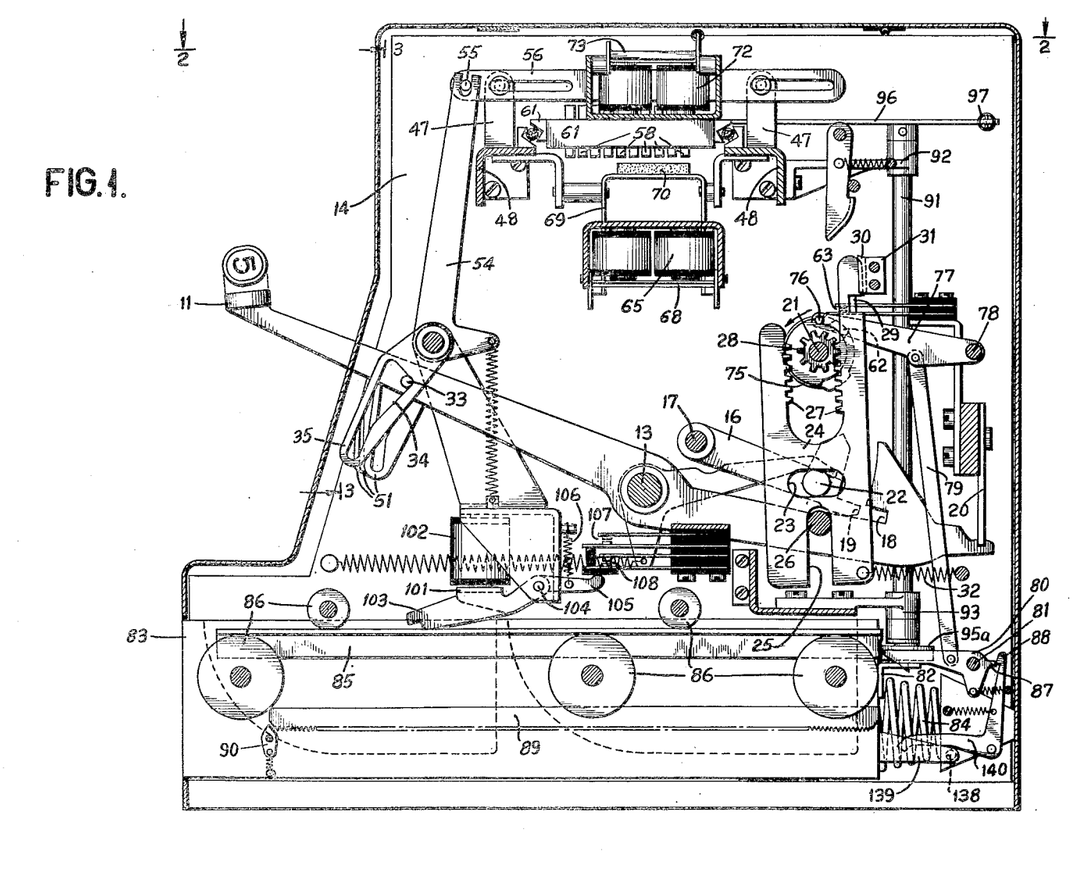
Fig. 1 is a transverse sectional view of the cash register to which the present improvements are preferably applied.

Suitably mounted in the side frames 14 and 15 is a transverse rotary shaft 21 (see Fig. 1) which is adapted to be given a complete rotation upon each reciprocation of the key coupler 16 by the mechanism shown in detail in Fig. 1. By referring to said figure, it will be noted that at its right-hand end the key coupler 16 is provided with a stud 22 which projects into an elongated slot 23 formed in the vertically reciprocable double rack 24. At its lower end the double rack 24 is provided with an open slot 25 which straddles a stud 26 carried by the right-hand side frame 15. At its upper end the rack 24 is also slotted and the inside walls of the slot are furnished with oppositely faced rack teeth 27 which cooperate with a pinion 28 fast on the rotary shaft 21. At the end of the down stroke of the depressed key, a lug 29 on rack 24 is above a lug 30 which is part of a bracket 31 attached to the side frame 15. A spring 32, extended between a fixed pin and the lower end of the double rack 24, has one end above the stud 26 when the rack 24 is fully elevated thereby disengaging the right-hand teeth 27 of the double rack from the pinion 28, and engaging the left-hand teeth 27 with the pinion 28. The lug 29 thereupon comes down on the right-hand side of the lug 30 to rock shaft 21 in the same direction and when the rack is in its lowermost position spring 32 rocks it counterclockwise to the position shown in Fig. 1. The above described mechanism is substantially the same in construction and operation as the mechanism shown in the aforementioned patent to Carney No. 497,860 and is for the accomplishment of the same purpose, that is, to effect a complete rotation of the shaft 21 in one direction at each reciprocation of the key coupler 16, the rotation being in the arrow direction shown in Fig. 1.

Any suitable mechanism may be provided to prevent a retrograde movement of the shaft 21 once the operation of the machine has been initiated. Such mechanisms usually consist of a ratchet-shaped disc carried by the shaft 21 and which cooperates with a full stroke pawl so as to enable the rotation of the shaft 21 in only one direction. Such form of full stroke mechanism is fully shown and described in the patent to Von Pein No. 1,371,653, dated March 15, 1921, referring particularly to Fig. 6 of the drawings of this patent.

Differential mechanism

Figure 3:
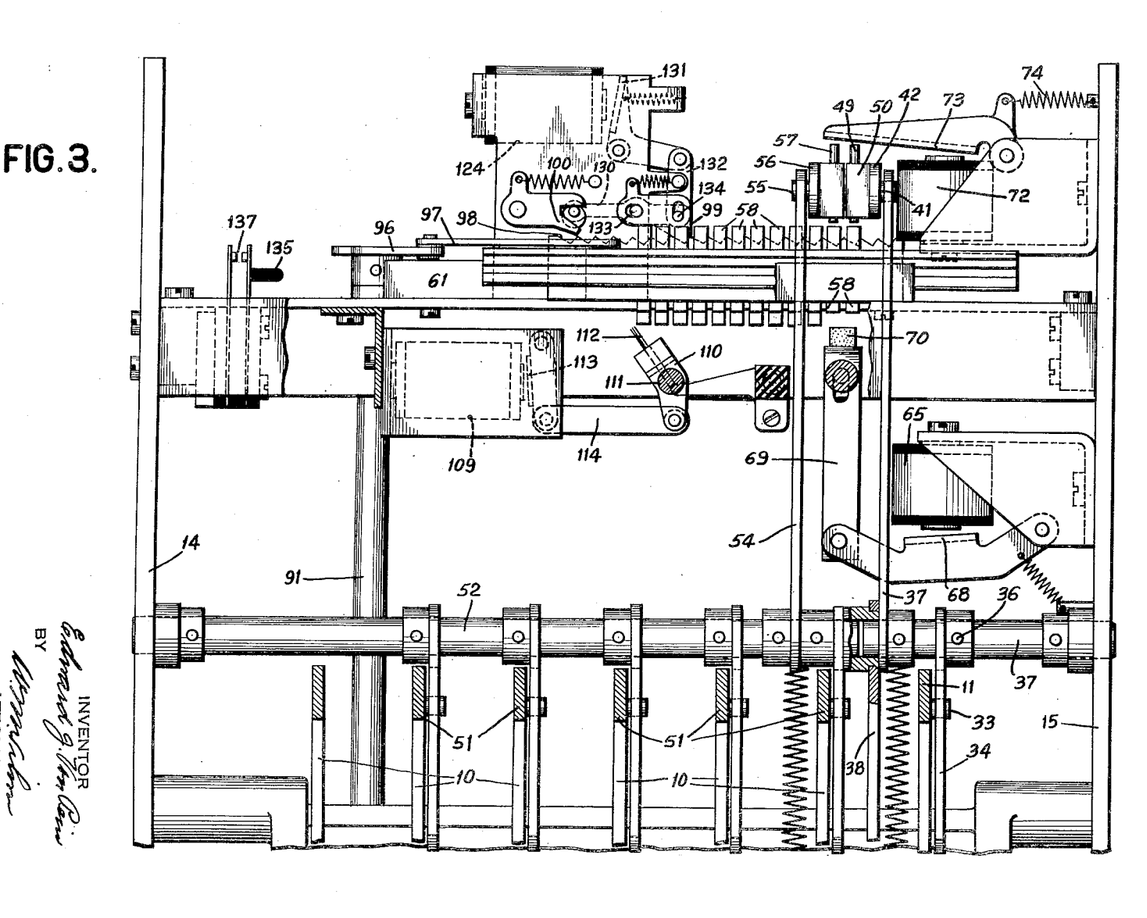
Fig. 3 is a view in front elevation, on an enlarged scale, and is taken on the line 3—3 of Fig. 1.
Figures 4, 5:
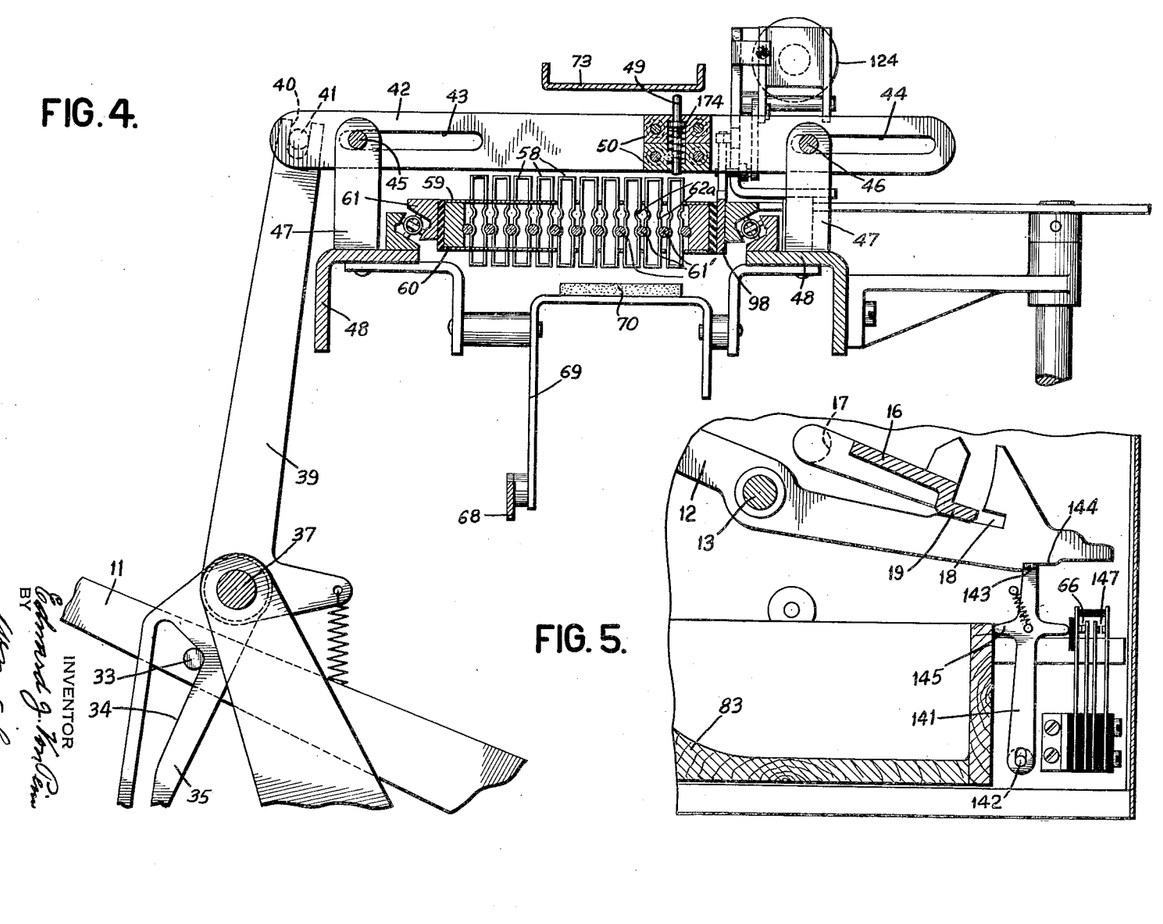
Fig. 4 is a detail view showing the operating connection between the five cent key and the associated punch setting pin, and punch selector elements.
Fig. 5 is a detail view showing the manner of operating certain electrical contacts upon the depression of the "no sale" key to prevent the operation of the punching machine.

The operating keys 10 and 11 have associated therewith a differential mechanism whereby certain parts may be set to subsequently select punches which are to punch a tabulating card with designations representing the values of the keys depressed. As best shown in Fig. 4, the five cent key 11 carries a pin 33 coacting with a cam edge 34 of a cam plate 35 which is pinned by a pin 36 (Fig. 3) to a rock-shaft 37. The rock-shaft 37, as best shown in Fig. 3, is a short shaft and is journaled in the side frame 15 and an intermediate frame 38. To the rock-shaft 37 there is secured an upstanding arm 39 (Fig. 4) the upper portion of the arm 39 being provided with a bifurcation 40 (see Fig. 4) which receives a pin 41 carried by a slidably mounted plate 42. The plate 42 is provided with elongated guide slots 43 and 44 receiving respective guide rods 45 and 46. Each guide rod 45 and 46 is carried by a related pair of brackets 47 which, in turn, are carried by a related transverse supporting plate 48. Each supporting plate 48 extends between and is carried by the side plates 14 and 15, as shown in Fig. 2.

As is best shown in Fig. 4, the plate 42 carries a spring pressed setting pin 49 and the pin 49 is slidably mounted in blocks 50 carried by the plate 42.

The cam edge 34 (Fig. 4) of the cam plate 35 is of such formation that when the five cent key is depressed the rock-shaft 37 will be rocked a certain extent thereby rocking arm 39 in a counterclockwise direction to move the plate 42 to the left, as shown in Fig. 2, thereby bringing the setting pin 49 into operative correlation with a related punch selector element 58, and which will be described more in detail hereinafter.

Each of the keys 10 has associated therewith a related cam plate 51 (as shown in Figs. 2 and 3) and each of the cam plates 51 is pinned to a supplemental rock-shaft 52 which, as shown in Fig. 3, is journaled between the side frame 14 and the intermediate frame 38. The cam plates 51 associated with the keys 10 are secured to the shaft 52 at different angles (as shown in Fig. 1) so that a rocking movement will be imparted to the shaft 52 to an extent which is commensurate with the value of the key depressed. For example, the cam plate 51 associated with the ten cent key will, during its full depression, rock the shaft 52 to an extent of one step. The twenty cent key will rock the shaft 52 to an extent of two steps, etc., the number of steps increasing with the higher value of the key.

As best shown in Fig. 3, the shaft 52 has secured thereto an upstanding arm 54 (Fig. 1), similar to the arm 39. Arm 54 has a pin and slot connection 55 (see Fig. 3) to a slidably mounted plate 56 and, plate 56 also carries a related setting pin 57 (Figs. 2 and 3), similar in construction and mounting to the pin 49 previously described. It is also explained that the plate 56 is also slidably supported in the same manner as the plate 42.

It is obvious, therefore, that the depression of the keys 10 will effect a differential movement of the plate 56 thereby positioning the setting pin 57 a number of steps commensurate with the value of the key depressed.

*Punch selecting elements*

Associated with the setting pins 49 and 57 are two groups of punch selecting elements 58. The latter are slidably mounted in a frame comprising plates 59 and 60 (Fig. 4) which are carried by a slidably mounted carriage 61, the latter being movable step by step to effect successive punch selecting operations, as will be subsequently described in detail. The punch selecting elements 58 are formed of resilient material and are guided by the plates 59 and 60 (Fig. 4) and are held in raised or depressed position by means of rods 61' which are adapted to engage aligning indentations 62a formed in the sides of the elements 58.

The setting pins 49 and 57 are adapted to be normally in the position shown in Fig. 2 wherein it will be seen that they each normally overlie the "0" punch selecting element 58 of the respective row of elements. When the five cent key 11 is depressed the related punch setting pin 49 will be positioned so as to overlie the "5" punch selecting element 58. The setting pin 57 of the tens keys is adapted by its differential position to be positioned over the punch selecting elements 58 of the related row of elements and overlie those designated in Fig. 2 by 0 to 5 of the respective row.

In order to restore any of the previously depressed punch selecting elements 58 and which were set in accordance with the keys previously depressed, the following resetting means is preferably employed. As best shown in Fig. 1, the shaft 21 carries a cam 62 which is adapted to close contacts 63 during the downward depression of the keys and before the setting pins 49 and 57 have been differentially set. From the wiring diagram shown in Fig. 7, it will be seen that a circuit will be closed from one line side 64, through the contacts 63 to a magnet 65, and through normally closed contacts 66 to the other line side 67. The energization of the magnet 65 will attract its armature 68 (see Fig. 3) thereby elevating a slidably mounted U-shaped frame plate 69 (see Fig. 4). The latter carries a block 70, preferably of rubber, and it will be seen from the Fig. 3 that the block 70 is sufficiently wide so as to be operatively correlated with the two rows of contact elements 58 which are adjusted by the keys, and of sufficient length, as shown in Fig. 4, so as to be operatively correlated with the six contact elements 58 in the respective row. Since one of the contact elements 58 in the right row (Fig. 2) is always depressed, this being the "0" or "5" contact element 58, it will be seen that the block 70 will coact with such element and any other depressed contact elements 58 of the other row and restore them to their normal elevated position.

The means for depressing the selected contact elements 58 which are selected by the positioning of the setting pins 49 and 57 will now be described in detail.

After the selected keys have been depressed and pins 49 and 57 have been set to their differential positions, and after previously set punch selector elements 58 are restored, pins 49 and 57 are depressed so as to effect the depression of the selected punch selector elements 58. This is preferably effected by the following described means.

Figure 7:
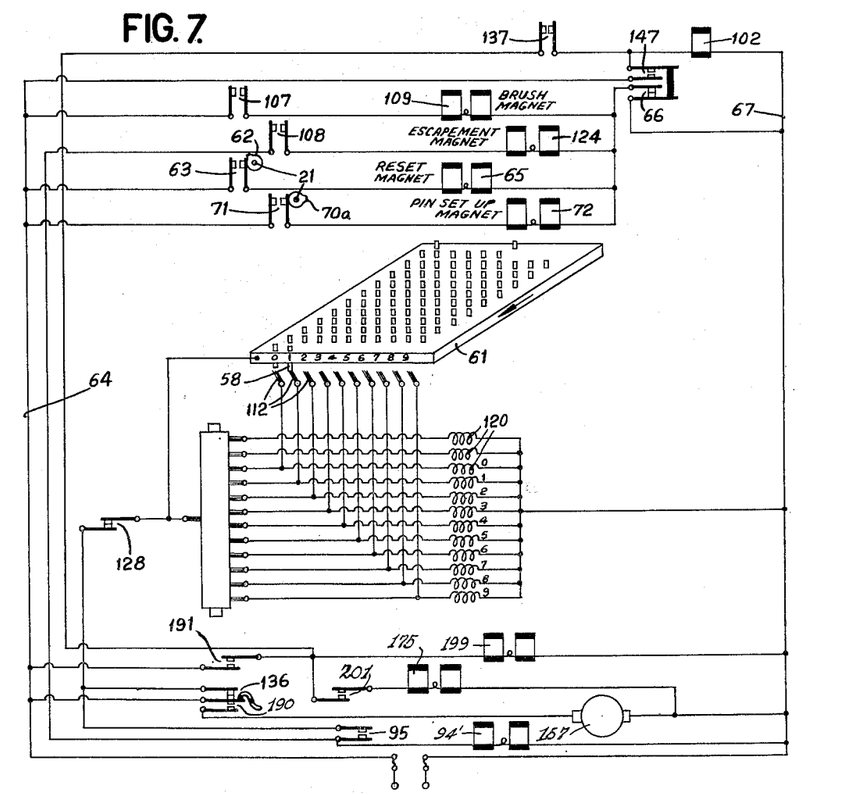
Fig. 7 is an electrical wiring diagram of the punching machine and cash register.

Referring to Figs. 2 and 7, it will be seen that to the shaft 21 there is secured a cam 70a which is adapted to close contacts 71 and this cam is timed to close contacts 71 after the keys have been fully depressed to set the pins 57 and 49 in their differential positions. This will cause a circuit to be closed from the line side 64, through contacts 71, to a pin set-up magnet 72, which is electrically connected to the other side of the line 67 through contacts 66 now closed. Referring to Figs. 2 and 3, the energization of the magnet 72 will attract its armature 73 causing a spring 74 connected to the armature 73 to be tensioned. The armature 73, as best shown in Fig. 2, is of such dimensions so as to always overlie the setting pins 49 and 57, irrespective of the differential positions to which they have been set. The rocking of the armature 73 will, therefore, depress the setting pins 49 and 57 causing the selected punch selector elements 58 to be depressed whereby the indentations 62a (Fig. 4) of the depressed punch selector elements 58 will be received by the related aligning rods 61', holding such punch selector elements 58 in depressed position. When cam operated contacts 71 open, the magnet 72 will be deenergized and the armature 73 will be returned by spring 74 to its normal position. Each setting pin 49 and 57 will, thereupon, be returned to its normal elevated position under the action of the related spring. In Fig. 4 the spring designated by reference numeral 174 is the return spring for the setting pin 49, it being understood that, while not shown, a similar return spring is provided for the setting pin 57.

When the keys have been fully depressed they return to their normal elevated position and by the reverse operation of the associated differential mechanism the plates 42 and 56 are restored to normal, as well as the setting pins 49 and 57 carried thereby. However, the punch selector elements 58 which have been selected under control of the keys will remain in depressed position.

At the extreme downward stroke of the keys the shaft 21 (Fig. 1) will have been rotated sufficiently so that the high point of a cam 75 will engage a pin 76 thereby rocking a lever 77, which carries the pin 76, in a clockwise direction about its pivotal point 78. The rocking of the lever 77 will elevate a link 79 which is interconnected between the lever 77 and a drawer catch lever 80 which is pivoted upon a rod 81. The drawer catch lever 80 normally catches over a bracket 82 attached to the rear end of a drawer usually a cash drawer 83 and when the drawer catch lever 80 is disengaged from the bracket 82 a coil spring 84, of the usual construction, will be effective so as to propel the cash drawer 83 outwardly of the cabinet of the cash register. When the drawer catch lever 80 is rocked to unlatch the cash drawer an extension 87 thereof will be caught by a latching bell crank 88 thereby latching the drawer catch lever 80 in its operated position. For guiding the movement of the cash drawer 83 outwardly the cash drawer is provided at each side with an angle plate, one of which is shown in Fig. 1 and designated by reference numeral 85. Underlying and overlying each angle plate 85 are a plurality of rollers 86 upon which the cash drawer rolls and is guided to its outward position.

In order to insure that the above mentioned drawer will be moved outwardly to its fully exposed position, the latter has coordinated therewith a full stroke device which comprises, as shown in Fig. 1, a ratchet shaped plate 89 secured to the cash drawer and cooperating with a full stroke pawl 90. The shape of the ratchet teeth of the plate 89 is such that the cash drawer must be moved fully outward before the pawl 90 is disengaged from the ratchet teeth of the plate 89 to enable the subsequent restoration of the cash drawer within the cabinet.

In order that the depressed punch selector elements 58 may control successive punch selecting operations, the frame 61 is moved step by step in order that the punch selector elements 58 selected by the keys, as well as other punch selector elements 58 to be described more in detail hereinafter, control punching operations.

Referring to Fig. 1, it will be seen that a rockshaft 91 is journaled in brackets 92 and 93 and the lower end of the rock-shaft 91 (Fig. 2) has secured thereto a lever 94 carrying a roller 95a. Secured to the upper end of the shaft 91 is a double lever 96, one arm of which has connected thereto a normally tensioned spring 97. The tension of this spring normally urges the roller 95a against the rear of the cash drawer so that, as the cash drawer moves outwardly, the roller 95a will follow its outward movement thereby causing shaft 91 to be rocked. The other end of the double lever 96 is connected to the carriage 61 through a link 97 and through this connection the rocking of shaft 91 moves the carriage 61 to the left, as viewed in Fig. 2. Such movement, however, is normally prevented by the following described means. Referring to Fig. 3, it will be seen that there is secured to the carriage 61 an escapement rack 98 and cooperating with the escapement rack 98 is a well known form of escapement mechanism comprising a pair of pawls 99 and 100 which are operated to permit a step by step movement of the carriage 61. The pawl 99 normally engages one of the teeth of the escapement rack 98 thereby holding the carriage 61 in its normal position. The means for effecting the step by step movement of the carriage 61 so that the depressed punch selector elements 58 may effect successive punching operations will be subsequently described in detail.

Referring to Fig. 1, it will be seen that an armature 101 of a magnet 102 has a downwardly extending arm 103 and to the pivot rod 104 to which the armature 101 is secured there is secured an arm 105, to which a spring 106 is attached. The spring 106 is normally tensioned so as to cause the arm 103 of the armature to normally rest upon the related angle plate 85. When the cash drawer is moved to its fully outward position the arm 103 will be disengaged from the angle plate 85 permitting a spring 106 to be effective to rock the arm 105 and cause the closure of contacts 107 and 108. The arm 103 will also be rocked and will now engage the rear end of plate 85 to lock the cash drawer in its outward position. Referring to Fig. 7, it will be seen that the closure of contacts 107 will cause the closure of a circuit from the line side 64 to contacts 107, to a magnet 109, the magnet being connected to the other line side 67 through contacts 66 which are now closed.

From Fig. 3, it will be noted that a brush holder 110 pivoted on a rod 111 carries a series of ten electrical contact brushes 112, there being one brush for each digit representing punch selector elements 58 for the respective rows of punch selector elements. From Figs. 2 and 3, it will be seen that the armature 113 of magnet 109 is connected to depending extensions of the brush holder 110 by a pair of links 114. The energization of the magnet 109 will result in the attraction of the related armature 113 thereby, through the links 114, rocking the brush holder 110 in a clockwise position in Fig. 3, bringing the electrical contact brushes 112 into electrical contact with the first left-hand row of punch selector elements 58. Obviously, as long as the cash drawer 83 remains in its outward position, and it is now in such locked position, the contacts 107 controlling the energization of the magnet 109 will retain this magnet energized to thereby retain the electrical contact brushes 112 in their elevated or contact making position.

Figure 6:
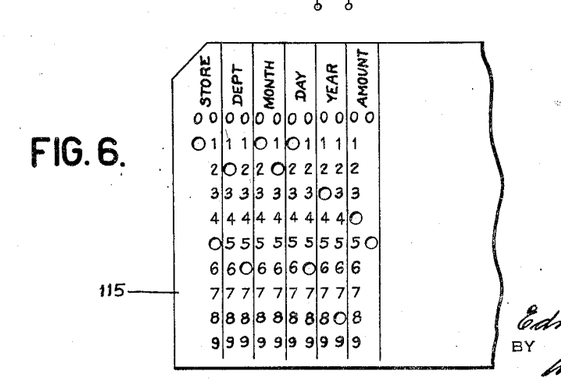
Fig. 6 is a fragmentary plan view of a tabulating card capable of being punched by the punching machine associated with the cash register herein shown and described.

Reference has been made, heretofore, to the two right-hand rows of punch selector elements 58 which are set under control of the operating keys of the machine. These punch selector elements are adapted, as will be subsequently explained in detail, to effect the punching of the tabulating card 115 shown in Fig. 6 to represent the amount of the sale or transaction. The perforations representing the amount are made in the card field designated "Amount" in Fig. 6. In the example shown, the amount of a sale has been punched upon the tabulating card and represents 45¢. It is well known that, in addition to punching the amount, the tabulating card should also contain additional classification data whereby certain statistics related to the sales in a store may be obtained. Such classification data is represented on the tabulating card in Fig. 6 by punching in the first ten columns at the left. Each of the different card fields are also designated in the tabulating card shown in Fig. 6 so that it will be apparent what such classification designations represent. In order to effect punching of the classification data on the tabulating card, the carriage 61 is provided with ten additional rows of punch selector elements 58. These punch selector elements are of the same construction as has been previously described but instead of being set under control of the keys they are manually set to represent certain data. For effecting the manual setting, the cabinet of the cash register may be provided with a hinged lid which will give access to the punch selector elements 58 just mentioned, and these may be manually depressed to contact making position to represent certain data and held in such position by the aligning means previously described. If so desired, the aforementioned lid may be provided with a key controlled lock so that only authorized persons can obtain access to the manually set punch selector elements 58.

From Fig. 3, it is obvious that when the magnet 109 is energized, the series of brushes 112 will be elevated to contact making position to make electrical contact with one of the two depressed punch selector elements 58 in the first left-hand row. As shown in Fig. 7, the punch selector element representing 1 has been set in this row so that upon the elevation of the brushes 112 the related brush will make contact with such punch selector element thereby closing a circuit now to be described in detail.

Punching machine

Figure 8:
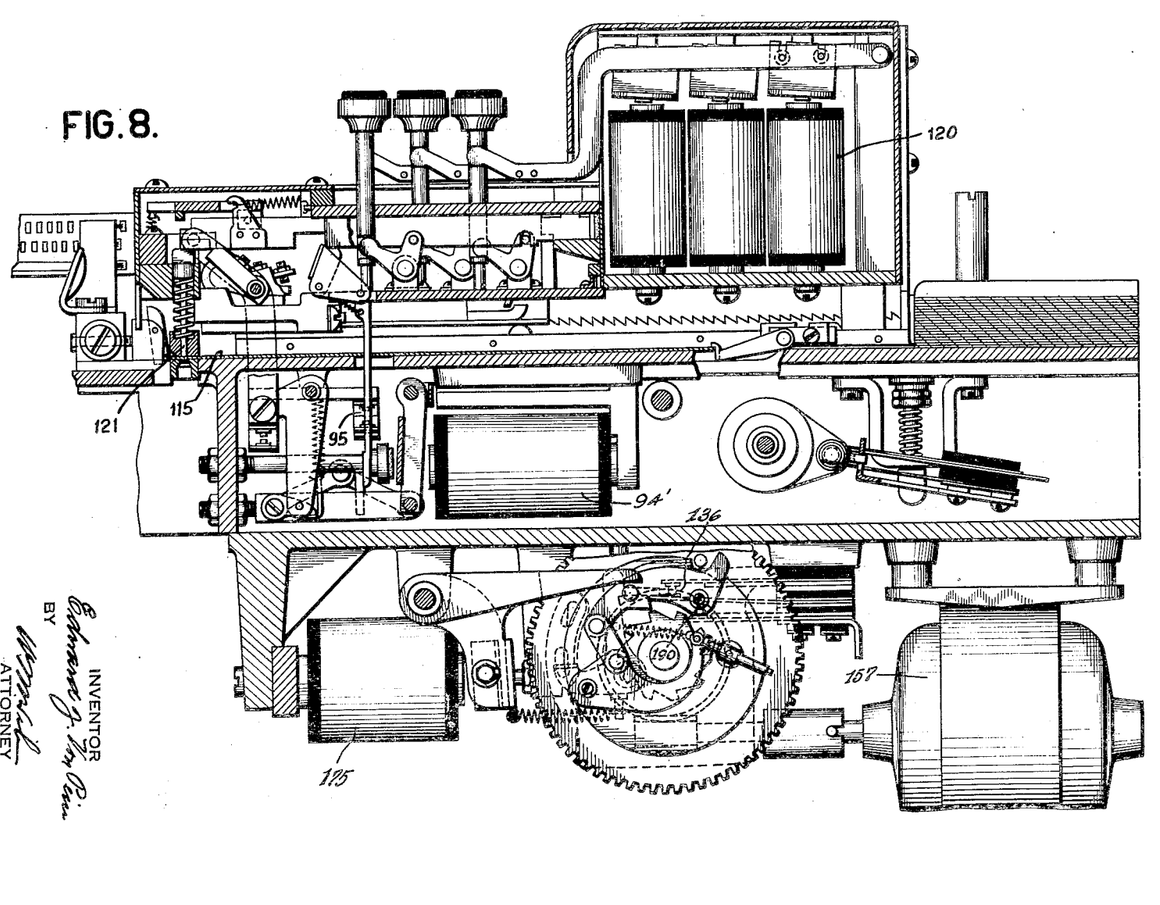
Fig. 8 is a fragmentary longitudinal sectional view of a punching machine of a well known form and which is preferably associated with the cash register shown herein.

The punching machine for punching the tabulating card under control of the punch selector elements is preferably of the type fully shown and described in the patent to Lee et al., No. 1,976,618, dated October 9, 1934. Figure 8 herein shows part of the construction of the punching machine shown in this patent and since it is well known in the art to which the present invention appertains, it is believed unnecessary to describe the construction and operation of this punching machine in detail. For this reason, only a general description of its construction and operation will be given and only as much as is necessary to understand the operation of the punching machine and its coordination with the cash register.

Referring to Fig. 7, it will be seen that upon the elevation of the brushes 112 a circuit will be closed from the line side 64 through contacts 136, and which correspond to contacts similarly designated in Patent No. 1,976,618, from said contacts to contacts 128, and which also correspond to similarly designated contacts in the last mentioned patent, and from said contacts to an electrical connection to the carriage 61. Through the depressed punch selector element 58, it will be seen that a contact will be made to the related brush 112 and to a respective punch control magnet 120 and from said magnet 120 to the other line side 67. It will be seen from Fig. 7 that the electrical brushes 112 have respective wire connections to the related digit punching magnets 120 so that upon the contact of a related brush 112 with one of the depressed punch selectors 58, the respective magnet 120 will be energized.

The punch magnets 120 are also shown in Fig. 8 and they correspond to the punch magnets designated by reference numeral 60 in Patent No. 1,976,618.

As more fully explained in the last mentioned patent, the energization of the punch control magnet 120 will effect the depression of a related punch 121 (Fig. 8) thereby causing the punch to pass through the tabulating card 115 at the respective index point position to perforate the tabulating card at such position.

As more fully explained in the patent to Lee et al., No. 1,976,618, whenever a punching operation is effected, contacts 95 (Figs. 7 and 8) are closed and such contacts correspond to similarly designated contacts in the last mentioned patent. In Fig. 7 there are shown some of the electrical magnets and related circuits illustrative of the punching machine shown in the patent to Lee et al., 1,976,618. Contacts 95 (Figs. 7 and 8) are closed whenever a punching operation is effected to close a circuit to a punch magnet 94', also shown in Fig. 8, and corresponding to punch magnet 94 of the patent. This circuit is through normally closed contacts 136 which correspond to contacts similarly designated in the patent. From Fig. 7, it will be seen that upon the closure of the contacts 95, a circuit will be closed from the line side 64 through contacts 136, through contacts 95 which have a wire connection to the contacts 108, and from said contacts to the escapement control magnet 124 and from this magnet to contacts 66 to the other line side 67. As will now be explained in detail, the escapement control magnet 124 causes the operation of the escapement mechanism so that the carriage 61 may be moved a step to effect the successive punching operation.

The escapement mechanism just referred to is of the same nature as that disclosed in the Schaaff Patent No. 1,426,223, dated August 15, 1922 and reference may be had to this patent for further details of construction and operation.

In the present machine the escapement mechanism is operated by the energization of the magnet 124 (Fig. 3) and this is effected by a connection between the armature of the magnet 124 and a lever 130 (Fig. 3). The lever 130 corresponds to the lever designated 112 in the patent to F. Lee et al., No. 1,976,618, which also shows an escapement mechanism corresponding to that disclosed in the aforementioned Schaaff patent. To the armature 131 of the magnet 124 there is connected a link 132 which is pivotally connected to the lever 130. The attraction of the armature 131 by the energization of magnet 124 will elevate link 132 and rock the lever 130 about its pivotal point 133, since the lower end of link 132 is connected to the right-hand end of lever 130 by a pin 134. The rocking of the lever 130 in a clockwise direction will, as fully explained in the Schaaff and Lee patents, permit the holding pawl 100 to be lowered under control of its spring so as to engage the next tooth of the rack 98. Thereafter the pawl 99 will be elevated so as to move it out of engagement with the tooth of the rack it engages. The spring 97 (Fig. 2) will now be effective to move the carriage 61 and the latter will move one step to the left, as viewed in Fig. 3, thereby bringing the next row of punch selector elements into cooperation with the brushes 112 which are still in elevated position.

When the selected punch 121 (Fig. 8) has effected the punching operation contacts 128 will, as fully described in the patent to Lee et al., be opened thereby opening the circuit to the energized punch control magnet 120. The deenergization of the selected punch control magnet 120 will permit, as is fully explained in the patent to Lee et al., the opening of contacts 95 thereby opening the circuit to the escapement control magnet 124. This will cause the pawl 100 to be elevated in the position shown in Fig. 3 and the holding pawl 99 to be depressed so as to hold the carriage 61 in its stepped position.

In the manner just described, successive punching operations will be effected by the punching machine, the carriage 61 being moved step by step so that brushes 112 will successively cause the punching operations in accordance with the depressed punch selectors. The final punching operation consists in effecting punching operations under control of the punch selectors 58 of the last right-hand row and after this punching operation has been effected the card has been completely punched. Thereafter the carriage 61 is moved an additional step under control of the escapement mechanism and when so positioned the carriage 61 will engage a rubber block 135 to cause the closure of contacts 137 (Fig. 3). The closure of contacts 137 will close a circuit from the line side 64 (Fig. 7) through contacts 191, and which correspond to similarly designated contacts in the patent to Lee et al. and which are closed when the card carriage is in or has escaped to the last card column position, from contacts 191 to contacts 137, to the magnet 102, which is directly connected to the other line side 67. The energization of magnet 102 will, as shown in Fig. 1, attract its armature 101 thereby disengaging the arm 103 from the angle plate 85 causing the cash drawer 83 to be unlocked. The operator of the cash register may then return the cash drawer 83 within the cabinet and in so doing the rear end of the cash drawer will engage the roller 95a (Fig. 2) thereby causing through the connections to the carriage 61 previously described, the restoration of the carriage 61 to its normal position, where it will be held by the escapement mechanism.

When the magnet 102 is energized, contacts 107 and 108 (Fig. 1) will be opened thereby opening the circuit to the magnet 109 and magnet 124. The deenergization of the magnet 109, referring to Fig. 3, will permit the brushes 112 to be lowered out of contact with the punch selecting elements during the restoration of the carriage 61.

As the cash drawer is moved within the cabinet of the cash register, a pin 138 (Fig. 1) carried by a bracket 139 secured to the rear end of the cash drawer 83, will engage one arm 140 of the bell crank 88 thereby rocking the bell crank to unlatching position to release the previously latched drawer catch lever 80, permitting the latter to re-engage the bracket 82 and causing the cash drawer to be re-latched.

*Punch card control by the "no sale" key*

In the operation of the machine just described, it will be evident that a tabulating card is punched for each operation of the amount keys thereby giving an individual punched record of each sale or transaction entered in the cash register. It occasionally happens that it is necessary to obtain access to the cash drawer of the machine for the purpose of making change, etc., and which is performed by the operation of the "no sale" key 12. It is obvious, of course, that since the depression of such a key does not represent a sale or amount to be entered in the cash register a card should not be punched. The present machine has preferably incorporated therein a control by the "no sale" key which permits its usual function in the cash register but prevents a card punching operation. The means whereby the above result is obtained will now be described in detail. From Fig. 5, it will be seen that contacts 66 are held closed by means of a latching lever 141 which is pivoted at 142. The lever 141 is provided with a lug 143 which is normally caught by shoulder 144 provided at the rear end of the "no sale" key 12. When the "no sale" key 12 is depressed, the cash drawer 83 will be released in the usual manner and the shoulder 144 will be removed from the lug 143 permitting contacts 66 to open and contacts 147 to close, such action taking place by virtue of the resiliency of the contact blades.

From Fig. 7, it will be apparent that the opening of contacts 66 will open the circuits to the magnets 65, 72, 109 and 124 so as to prevent card punching operations to be effected since the magnet 109 and the magnet 124 must be energized in order to effect, in the manner previously described, card punching operations. The closure of contacts 147 will cause a circuit to be closed leading from the line side 64 (Fig. 7) to the contacts 147, to the magnet 102 which is directly connected to the other line side 67.

The energization of the magnet 102 will attract its armature 101 (Fig. 1) thereby retaining the arm 103 in elevated position so that when the cash drawer is released it will not be locked in its outward position as previously described. This will permit the free closure of the cash drawer when the operation desired has been performed.

When the cash drawer 83 is returned the rear end thereof will engage an extension 145 (Fig. 5) of the lever 141 thereby rocking the lever so that it may be relatched by the shoulder 144 of the "no sale" key, which is now in its normal position. The rocking of lever 141 will, of course, cause the closure of contacts 66 and the opening of contacts 147. The opening of contacts 147 will cause the deenergization of the magnet 102 so that its normal function may again be performed.

There are incidental operations effected in the punching machine of the well known form and after punching the last column the carriage skips to the last column position to close contacts 191 (Fig. 7) to close a circuit to a card ejector magnet 199, which in turn causes the closure of contacts 201 to effect the energization of the trip magnet 175 (Fig. 8). The latter opens contacts 136 and closes contacts 190 in the circuit of motor 157 which thereupon returns the card carriage and feeds the next card thereon. These elements are correspondingly designated in Patent No. 1,976,618 and illustrate the punching machine of this patent diagrammatically.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a machine of the class described, the combination of a plurality of keys, differential mechanism actuated by said keys, punch selector setting means comprising slides differentially positioned by said differential mechanism and carrying punch selector setting means, a step by step positionable carriage carrying punch selector elements, means actuated by the operation of the keys and actuated after said slides have been differentially positioned to set selected punch selector elements, a drawer released by the operation of said keys for movement to a certain position, a punching mechanism including punches successively selected by said punch selector elements, and means set in operation by the movement of the drawer to said certain position for causing the step by step positioning of said carriage to cause the selected punch selector elements to successively select the punches to effect successive punching operations.

2. In a machine of the class described, the combination of a plurality of keys, differential mechanism actuated by said keys, punch selector setting means comprising slides differentially positioned by said differential mechanism and carrying punch selector setting means, a step by step positionable carriage carrying punch selector elements, means actuated by the operation of the keys for operating the setting means after said slides have been differentially positioned to set selected punch selector elements, a drawer released by the operation of said keys for movement to a certain position, a punching mechanism including punches successively selected by said punch selector elements, means set in operation by the movement of the drawer to said certain position for causing the step by step positioning of said carriage to cause the selected punch selector elements to successively select the punches to effect successive punching operations, and means operable by the return of the drawer from said certain position for restoring said carriage to normal position.

3. In a machine of the class described, the combination of a plurality of keys, differential mechanism actuated by said keys, a punching mechanism including punches, a step by step positionable carriage carrying punch selector elements for selecting said punches for successive punching operations, means settable by said differential mechanism for causing the selective setting of the punch selector elements in accordance with the keys operated, an escapement mechanism for controlling the step by step positioning of the carriage to effect successive punch selecting operations, means operable in response to successive punching operations for causing the actuation of the escapement mechanism to control the successive step by step positioning of the carriage, resilient means normally blocked against operation for moving said carriage to cause the latter to be moved step by step under control of the escapement mechanism, and a drawer released by the operation of said keys for movement to a certain position, said drawer upon movement to said certain position releasing said resilient means for operation to move said carriage, and upon its return from the certain position for positively moving said carriage to its normal position.

4. In a machine of the class described, the combination of a plurality of keys, differential mechanism actuated by said keys, a punching mechanism including punches, a step by step positionable carriage carrying punch selector elements for selecting said punches for successive punching operations, means settable by said differential mechanism for causing the selective setting of the punch selector elements in accordance with the keys operated, an escapement mechanism for controlling the step by step positioning of the carriage to effect successive punch selecting operations, electromagnetic means operable in response to successive punching operations for causing the actuation of the escapement mechanism to control the successive step by step positioning of the carriage, resilient means normally blocked against operation for moving said carriage to cause the latter to be moved step by step under control of the escapement mechanism, a drawer released by the operation of said keys for movement to a certain position, means for automatically locking the drawer at said certain position, means controlled by the movement of the drawer to said certain position for initiating the operation of the punching mechanism and for releasing said resilient means for operation to move the carriage, and operative upon the return of said drawer from said certain position for positively moving said carriage to its normal position, and means operative upon the completion of punching operations for disabling said locking means for unlocking said drawer to enable its return.

5. In a machine of the class described, the combination of operating keys, differential mechanism actuated by the reciprocation of said keys, a punching mechanism including punches and punch selecting elements, means for effecting under control of the differential mechanism the selection of said elements for selecting punches for effecting successive punching operations, an element, means operated by the reciprocation of said keys to effect the automatic release of said element and automatic movement to a certain position, and means controlled by the movement of said element to said certain position for initiating the operation of the punching mechanism to cause successive punching operations, means for automatically locking said element in said certain position, and means operable upon the completion of punching operations by said punching mechanism for disabling said locking means for unlocking said element.

6. In a machine of the class described, the combination of a plurality of keys, differential mechanism actuated by said keys, a punching mechanism including punches and punch selecting elements, punch selector setting means settable by said differential mechanism, punch selector elements set by said setting means, means actuated by the operation of said keys for operating said setting means to set the selected punch selector elements, means to effect a successive coordination between said punch selecting elements and the punch selector elements for causing the selected punch selector elements to successively select the punches, a drawer released for movement to a certain position by the operation of the keys, and means operable in response to the movement of the drawer to said certain position for causing the operation of the last named means.

7. In a machine of the class described, the combination of reciprocable operating keys, differential mechaniism actuated by the reciprocation of said keys, a drawer released by said keys for movement to a certain position, means for automatically locking said drawer when moved to said certain position, a punching mechanism including punches and punch selecting elements, means for effecting the selection of said punch selecting elements under control of said differential mechanism, means set in operation by the movement of the drawer to said certain position for causing the initiation of operation of said punching mechanism, and means operable upon the completion of punching operations by said punching mechanism for disabling said locking means to unlock the drawer.

8. In a machine of the class described, the combination of reciprocable operating keys, differential mechanism actuated by the reciprocation of said keys, a drawer released by said keys for movement to a certain position, a punching mechanism including punches and punch selecting elements, means for effecting the selection of said punch selecting elements under control of said differential mechanism, and means set into operation by the movement of the drawer to said certain position for causing the initiation of the operation of said punching mechanism.

9. In a machine of the class described, the combination of operating keys, differential mechanism actuated by the reciprocation of said keys, a punching mechanism including punches and punch selecting elements, means for effecting the selection of said punch selecting elements under control of the differential mechanism for effecting successive punching operations, an element, means operated by the reciprocation of said keys to effect the automatic release of said element and automatic movement to a certain position, and means controlled by said element when moved to its certain position for initiating the operation of the punching mechanism to cause successive punching operations.

10. In a machine of the class described provided with a special key and operating keys, a punching mechanism including punches selected by said operating keys, an element released for movement to a certain position by the operation of said special key or said operating keys, means operable in response to the movement of said element to said certain position for initiating the operation of said punching mechanism, and means controlled by the operation of said special key for rendering the operation of said initiating means ineffective.

11. In a machine of the class described provided with a special key and operating keys, differential mechanism actuated by said operating keys, a punching mechanism including punch selecting elements selected by said differential mechanism, a drawer released for movement to a certain position by the operation of the operating keys and said special key, means operated in response to the movement of the drawer to said certain position for initiating the operation of the punching mechanism, and means controlled by said special key for rendering the operation of said last named initiating means ineffective.

EDWARD J. VON PEIN.